(12) United States Patent
Caze et al.

(10) Patent No.: US 8,211,377 B2
(45) Date of Patent: Jul. 3, 2012

(54) METHODS AND DEVICES FOR FALLING FILM REACTORS WITH INTEGRATED HEAT EXCHANGE

(75) Inventors: Philippe Caze, Fontainebleau (FR); Thierry Luc Alain Dannoux, Avon (FR); Celine Claude Guermeur, Chartrettes (FR); James Scott Sutherland, Corning, NY (US); Pierre Woehl, Cesson (FR)

(73) Assignee: Corning Incorporated, Corning, NY (US)

( * ) Notice: Subject to any disclaimer, the term of this patent is extended or adjusted under 35 U.S.C. 154(b) by 176 days.

(21) Appl. No.: 12/918,699

(22) PCT Filed: Feb. 27, 2009

(86) PCT No.: PCT/US2009/001233
§ 371 (c)(1),
(2), (4) Date: Aug. 20, 2010

(87) PCT Pub. No.: WO2009/110981
PCT Pub. Date: Sep. 11, 2009

(65) Prior Publication Data
US 2010/0326532 A1    Dec. 30, 2010

(30) Foreign Application Priority Data

Feb. 29, 2008   (EP) ..................................... 08305041

(51) Int. Cl.
*B01J 8/02*     (2006.01)
*B01J 35/02*    (2006.01)
*B01J 19/00*    (2006.01)
*B01J 10/00*    (2006.01)
*B01J 10/02*    (2006.01)
*F17D 1/00*     (2006.01)
*F17D 3/00*     (2006.01)

(52) U.S. Cl. ........ 422/222; 422/129; 422/198; 422/211; 137/1

(58) Field of Classification Search .................. 422/129, 422/198, 211, 222; 137/1; 165/164, 165
See application file for complete search history.

(56) References Cited

U.S. PATENT DOCUMENTS 1,701,805 A    2/1929   Dunn et al.
(Continued)

FOREIGN PATENT DOCUMENTS

BE       511466       6/1952
(Continued)

*Primary Examiner* — Walter D Griffin
*Assistant Examiner* — Natasha Young
(74) *Attorney, Agent, or Firm* — Gregory V. Bean

(57) ABSTRACT

Disclosed is a method of performing a reaction involving a gaseous reactant stream and a falling film liquid reactant stream by providing a reactor comprising a first multicellular extruded body oriented with its cells extending in parallel in a vertically downward direction from a first end of the body to a second end, the body having a first plurality of cells open at both ends of the body and a second plurality of said cells closed at one or both ends of the body, the second plurality of cells being arranged in one or more groups of contiguous cells and cooperating to define at least in part at least one fluidic passage extending through the body; and further flowing a liquid reactant film down inner surfaces of the first plurality of cells while flowing a gaseous reactant stream up or down the centers of the first plurality of cells while flowing a first heat exchange fluid through the at least one fluidic passage. Various alternative devices for performing the method are also disclosed.

10 Claims, 13 Drawing Sheets

U.S. PATENT DOCUMENTS

| | | | |
|---|---|---|---|
| 1,826,487 A | 10/1931 | Wiggins | |
| 1,960,043 A | 5/1934 | Anschicks | |
| 2,044,573 A | 6/1936 | Hornberger | |
| 2,068,421 A | 1/1937 | Long et al. | |
| 2,087,170 A | 7/1937 | Stephenson | |
| 2,186,752 A | 1/1940 | Connell | |
| 2,618,539 A | 11/1952 | Conta et al. | |
| 2,758,018 A | 8/1956 | Lisciani | |
| 2,789,238 A | 4/1957 | Staak | |
| 3,287,094 A | 11/1966 | Brownell | |
| 3,903,646 A | 9/1975 | Norton | |
| 3,918,917 A | 11/1975 | Ashina et al. | |
| 4,041,591 A | 8/1977 | Noll et al. | |
| 4,096,214 A | 6/1978 | Percevaut et al. | |
| 4,101,287 A | 7/1978 | Sweed et al. | |
| 4,810,330 A * | 3/1989 | Stage | 203/4 |
| 4,909,730 A | 3/1990 | Roussakis et al. | |
| 5,415,233 A | 5/1995 | Roussakis et al. | |
| 5,416,057 A * | 5/1995 | Lipp et al. | 502/439 |
| 5,445,801 A | 8/1995 | Pisoni | |
| 5,525,311 A | 6/1996 | Girod et al. | |
| 5,709,187 A | 1/1998 | Jaeger et al. | |
| 5,922,903 A | 7/1999 | Pujado et al. | |
| 5,964,086 A | 10/1999 | Kraemer | |
| 6,596,244 B1 | 7/2003 | Pujado | |
| 7,032,894 B2 | 4/2006 | Adusei et al. | |
| 2004/0024750 A1 | 2/2004 | Ulyanov et al. | |
| 2004/0179982 A1 | 9/2004 | Inaga et al. | |

FOREIGN PATENT DOCUMENTS

| | | |
|---|---|---|
| CA | 565942 | 11/1958 |
| CA | 666952 | 7/1963 |
| CA | 709337 | 11/1965 |
| CA | 1057187 | 6/1979 |
| DE | 10325231 | 4/1977 |
| DE | 19540538 | 7/1993 |
| DE | 1941734 | 10/2005 |
| EP | 0752390 | 1/1997 |
| FR | 2883490 | 9/2006 |
| WO | 2008/121390 | 10/2008 |
| WO | 2009/088464 | 7/2009 |

* cited by examiner

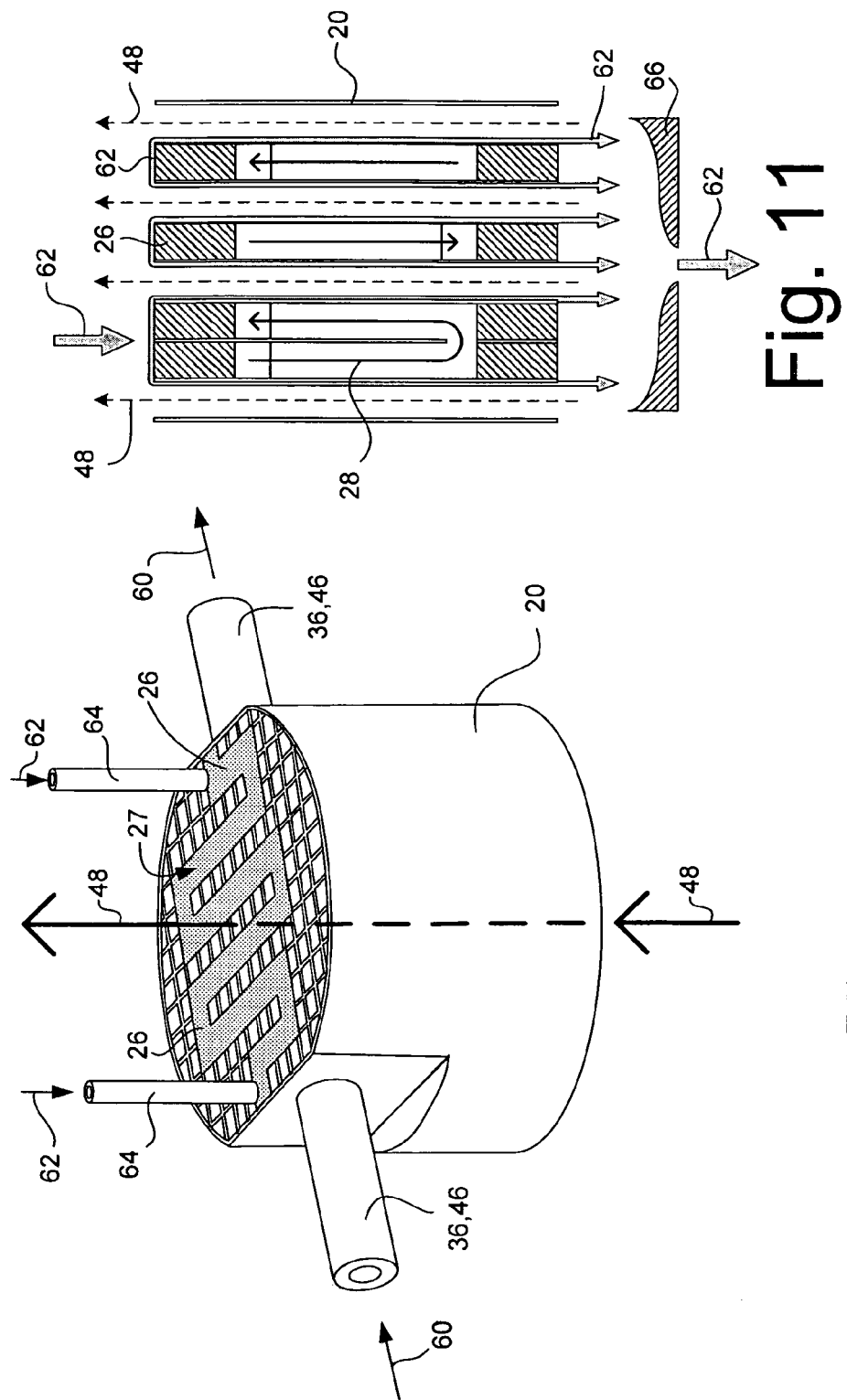

METHODS AND DEVICES FOR FALLING FILM REACTORS WITH INTEGRATED HEAT EXCHANGE

RELATED APPLICATIONS

The present application is related to U.S. Provisional Application Ser. No. 60/921,053, filed 31 Mar. 2007 entitled, "Honeycomb Continuous Flow Reactor" and to U.S. Provisional application 61/018,119 filed 31 Dec. 2007 entitled, "Devices and Methods for Honeycomb Continuous Flow Reactors".

PRIORITY

This application claims priority to European Patent Application number EP08305041.9 filed Feb. 29, 2008 titled, "Methods and Devices For Falling Film Reactors With Integrated Heat Exchange".

SUMMARY

According to one aspect of the invention, a method is disclosed of performing a reaction involving a gaseous reactant stream and a falling film liquid reactant stream by providing a reactor comprising a first multicellular extruded body oriented with its cells extending in parallel in a vertically downward direction from a first end of the body to a second end, the body having a first plurality of cells open at both ends of the body and a second plurality of said cells closed at one or both ends of the body, the second plurality of cells being arranged in one or more groups of contiguous cells and cooperating to define at least in part at least one fluidic passage extending through the body; and further flowing a liquid reactant film down inner surfaces of the first plurality of cells while flowing a gaseous reactant stream up or down the centers of the first plurality of cells while flowing a first heat exchange fluid through the at least one fluidic passage.

According to another aspect of the invention, a reactor useful for reacting a gaseous reactant stream with a falling film liquid reactant stream is disclosed. The has a first multicellular extruded body oriented with its cells extending in parallel in a vertically downward direction from a first end of the body to a second end. The extruded body has a first plurality of cells open at both ends of the body and a second plurality of said cells closed at one or both ends of the body and the second plurality of cells is arranged in one or more groups of contiguous cells and defines at least in part at least one fluidic passage extending through the body. The reactor further is provided with a fluid source structured and arranged so as to be able to distribute fluid to the first plurality of cells at the first end of the extruded body; a gas source positioned either above or below the extruded body structured and arranged so as to be able to flow a gas through the first plurality of cells; and a heat exchange fluid source connected to said at least one fluidic passage structured and arranged so as to be able to flow a heat exchange fluid therethrough.

BRIEF DESCRIPTION OF THE DRAWINGS

FIG. 10 is a perspective view showing fluid reactant, gaseous reactant, and eat exchange fluid delivery to an extruded body 20 according to an embodiment of the present invention.

FIG. 11 a cross section of an extruded body 20 showing reactant and heat exchange fluid distribution.

DETAILED DESCRIPTION OF THE PREFERRED EMBODIMENTS

Figure 2:
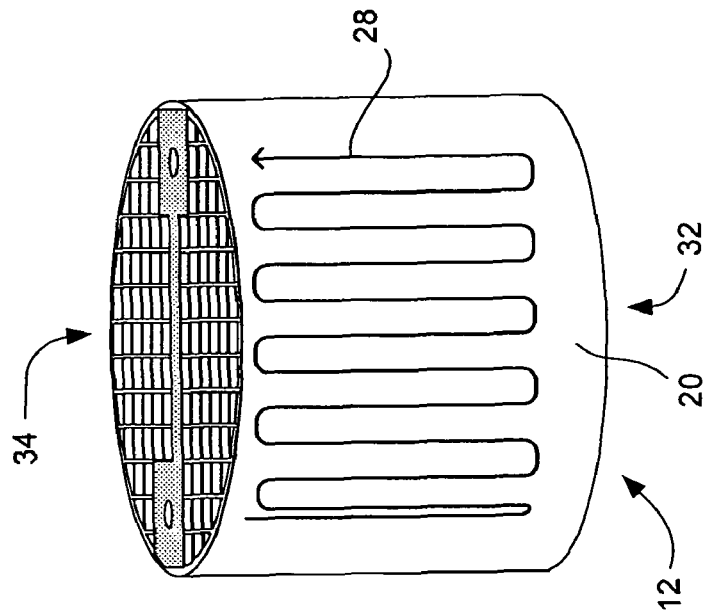
FIG. 2 is a side elevation view of the reactor component comprising an extruded multicellular body or honeycomb of FIG. 1, showing additional detail of a fluidic path according to an embodiment of the present invention.

Reference will now be made in detail to the presently preferred embodiments of the invention, instances of which are illustrated in the accompanying drawings. Whenever possible, the same reference numerals will be used throughout the drawings to refer to the same or like parts.

Figure 1:
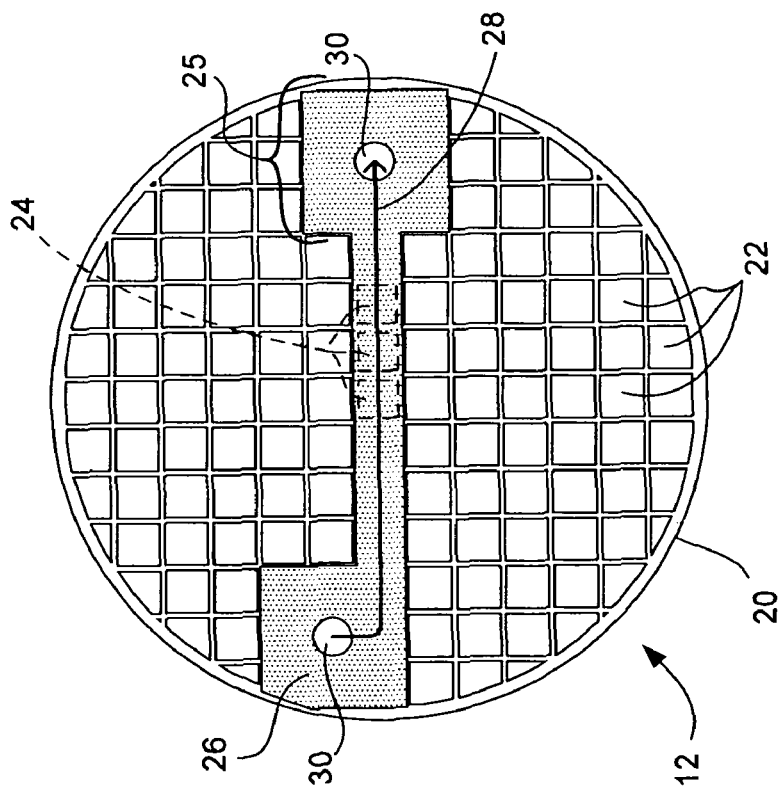
FIG. 1 is a plan view of reactor component comprising an extruded multicellular body or honeycomb showing a fluidic path in a plane perpendicular to the cells according to one embodiment of the present invention.

The present invention relates to a methods and devices for falling film reactions. In FIG. 1 is shown a plan view of a reactor component 12 useful in the devices and methods of the present invention. The reactor component 12 comprises a multicellular extruded body 20, one embodiment of which is represented in FIG. 1. The body 20 has a plurality of cells extending in parallel in a direction from one end of the body to the other, with the cells seen end-on in FIG. 1. The cells include a first plurality of cells 22 open at both ends of the body and a second plurality of cells 24 closed at one or both ends of the body, in this embodiment by one or more plugs 26 or by a more or less continuous plugging material 26 disposed at or near the end of the body and at least partly within the channels of the second plurality of cells 24. The second plurality of cells 24 (the closed cells) are positioned in one or more groups of contiguous cells, one group in this case, and cooperate to help define a fluidic passage 28 extending through the body 20. The passage 28 may follow a serpentine path up and down along the cells 24, in the general direction shown by arrowed 28, which will represent both the passage and its path. The passage or its path 28 may extend laterally perpendicular to the cells 24 only at or near the ends 32, 34 of the body 20, where walls between the cells 24 are shortened or ported or otherwise passed or breached to allow fluid communication between the cells 24.

Figure 4:
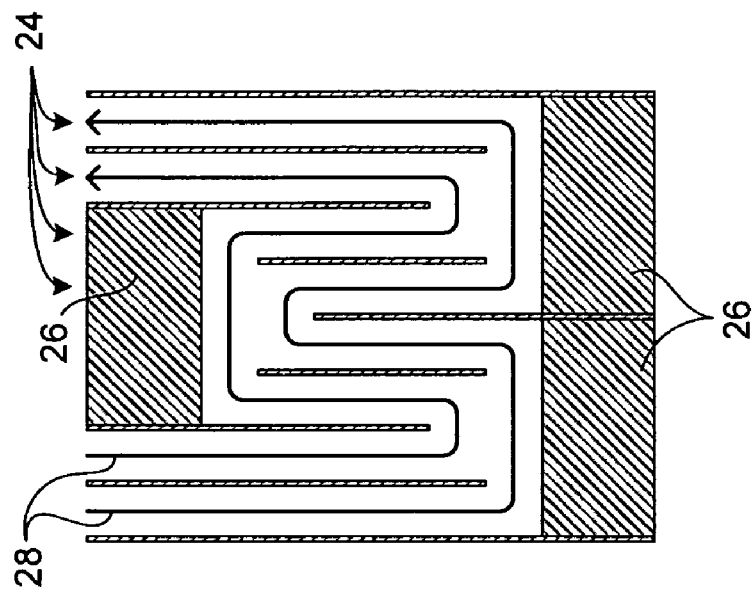
FIG. 4 is a cross-sectional view of channels closed on one or both ends of an extruded body, showing another method useful in the context of the present invention for interconnection between channels.
Figure 3:
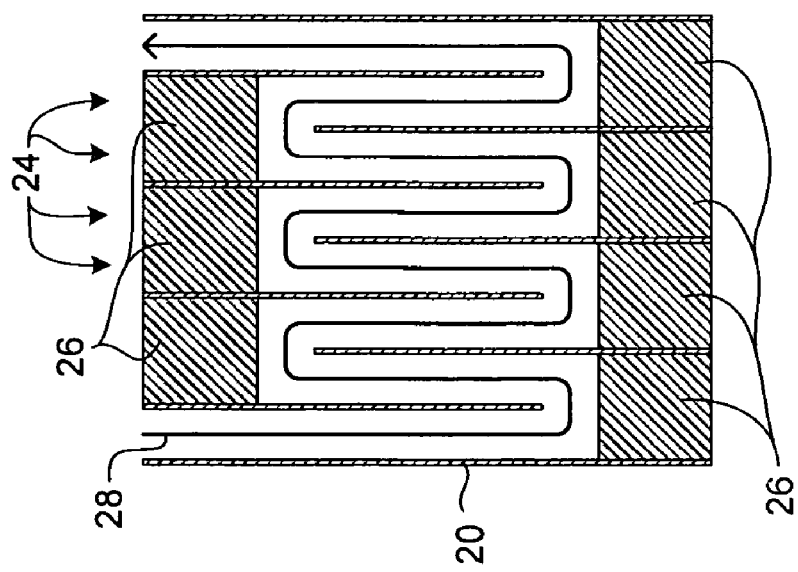
FIG. 3 is a cross-sectional view of channels closed on one or both ends of an extruded body, showing one method useful in the context of the present invention for interconnection between channels.

Such shortened walls between the cells 24 are shown in the cross sections of FIGS. 3 and 4, allowing the passage or path 28 to connect extend laterally perpendicular to the cells 24 at or near the of the body 20. As may be seen in FIG. 3, the path 28 may follow a single cell up and down in the direction along the cells 24. Alternatively, the path 28 may follow multiple successive respective groups of two or more cells in parallel, in the direction along the cells 24, as shown in FIG. 4, in which the path follows two cells in parallel.

Figure 5:
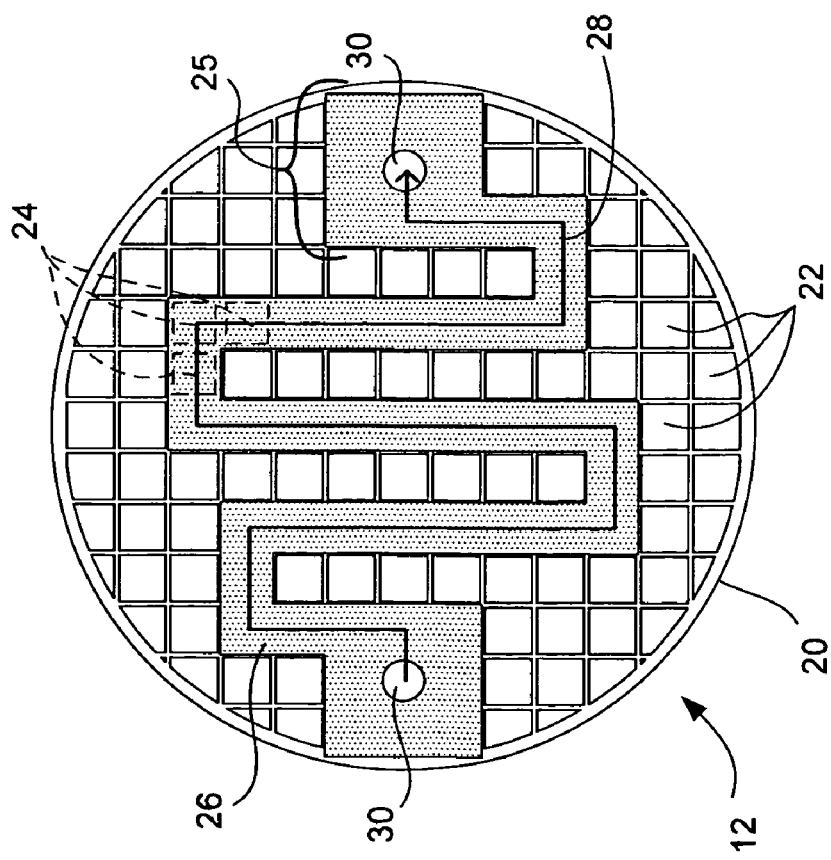
FIG. 5 is a plan view of reactor component comprising an extruded multicellular body or honeycomb showing another fluidic path in a plane perpendicular to the cells according to another embodiment of the present invention.

In another embodiment of the reactor component of FIGS. 1 and 2, the path is not serpentine only in the direction along the cells as shown in FIG. 2, but also in the plane perpendicular to the cells, as shown in the plan view of FIG. 5. The plurality of closed cells 24 in the plan view of FIG. 5 is arranged in a generally serpentine path in the plane perpendicular to the cells 24 and 22. The fluid path 28 is thus serpentine at a relatively higher frequency in the direction in and out of the plane of FIG. 5, and at a relatively lower frequency within the plane of the figure. This doubly serpentine path structure allows for high total path volume and long total path length while maintaining a large surface area between the path and the open cells 22, and allows for small total package size for the reactor 12.

The serpentine arrangement of closed cells in the plane perpendicular to the cells, the arrangement visible in FIG. 5, is not the only possible arrangement; other arrangements are possible or even desirable, depending on the application. It may be desirable, however, regardless of the shape of the path within the plane of FIG. 1 or FIG. 5, the plane perpendicular to the direction of the cells within the extruded body 20, that the majority of the path 28 be only one cell wide. This results in an easily manufactured fluidic path capable of having a very high surface to volume ratio. It may likewise be preferable that the open cells 22 positioned between rows of the path 28 be arranged in groups only one cell wide, as in FIG. 5. This allows for a fluid path through the open cells that has also has a very high surface to volume ratio.

Figure 6:
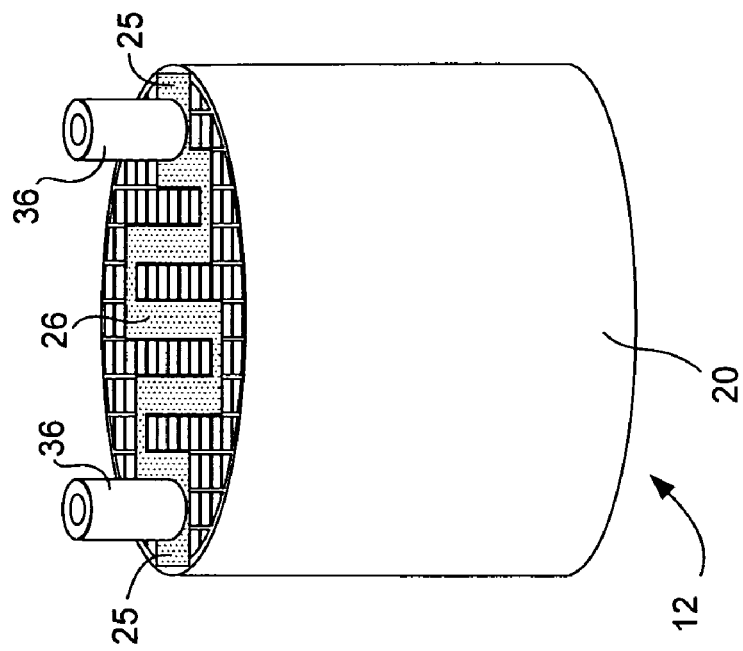
FIG. 6 is a side elevation view of the reactor component comprising an extruded multicellular body or honeycomb of FIG. 5, showing fluidic couplers coupled to input and output ports at one end of the extruded body.

Additional cells of the closed cells 24, in a grouping 25 of more than one cell in width, if desired, may be plugged around the entry and exit ports 30 of the pathway, as shown in FIGS. 1 and 5. These additional plugged cells can provide support for an O-ring seal or a fired-frit seal or polymer adhesive seal or any other desirable sealing system for providing a fluidic connection to the path 28, and generally would not form a part of the passage or path 28. One embodiment is shown in FIG. 6, in which access tubes 36 have been sealed to two groupings 25 of plugged cells.

The extruded body or honeycomb 20 is desirably formed of an extruded glass, glass-ceramic, or ceramic material for durability and chemical inertness. Alumina ceramic is generally presently preferred as having good strength, good inertness, and higher thermal conductivity than glass and some ceramics. Other higher thermal conductivity materials may also be employed. The multicellular body desirably has a cell density of at least 200 cells per square inch. Higher densities can lead to higher heat exchange performance devices. Bodies having 300 or more, or even 450 or more cells per square inch may be of potential interest for forming high performance devices.

Figure 7:
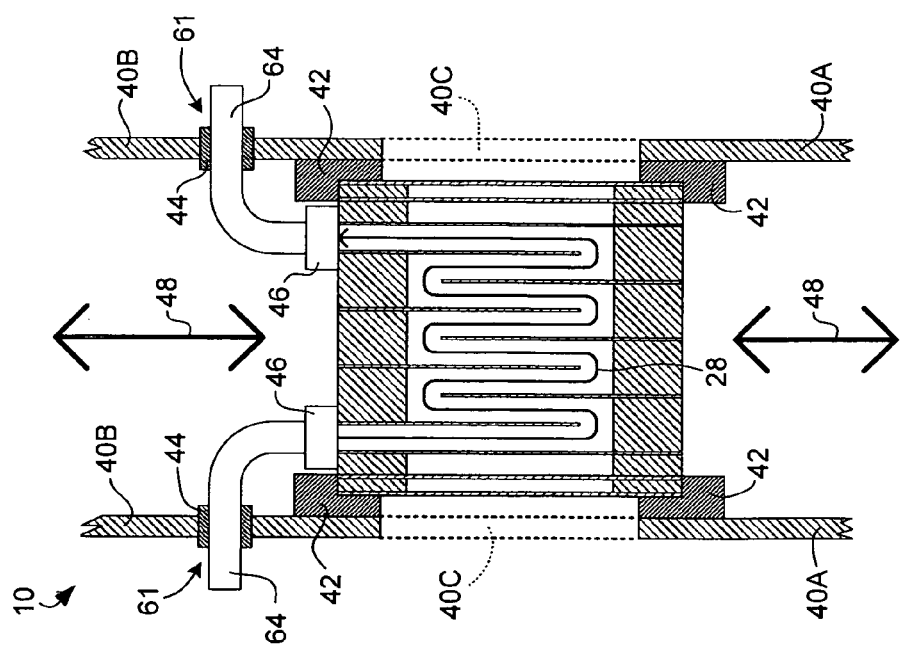
FIG. 7 is a cross-sectional view of a reactor component of the present invention comprising an extruded multicellular body or honeycomb showing fluidic connections to the extruded body according to one embodiment of the present invention.

FIG. 7 is a cross-sectional view of the main components of one embodiment of a reactor 10 of the present invention comprising an extruded multicellular body or honeycomb, showing fluidic connections to the extruded body according to one embodiment of the present invention. In the embodiment of FIG. 7, a fluid housing 40 supports the extruded body via seals 42. The housing 40 may comprise a single unit enclosing the extruded body, or the middle portion 40C may optionally be omitted, such that the housing comprises two parts 40A and 40B. According to the presently preferred embodiments of the invention, a reactant fluid passage or path 48 for liquid film reactants and gaseous reactants is formed through the open channels 22 (shown in FIGS. 1 and 5) in cooperation with the housing 40. Path 28 in the body 20 is accessed via fluid conduits 64 through fluidic couplers 46, and is utilized for heat exchange fluid or alternatively a reaction that acts as a desired heat source or sink. Fluid conduits 64 pass through openings 61 in the housing 40, in which openings 61 a seal 44 is employed.

Figure 8:
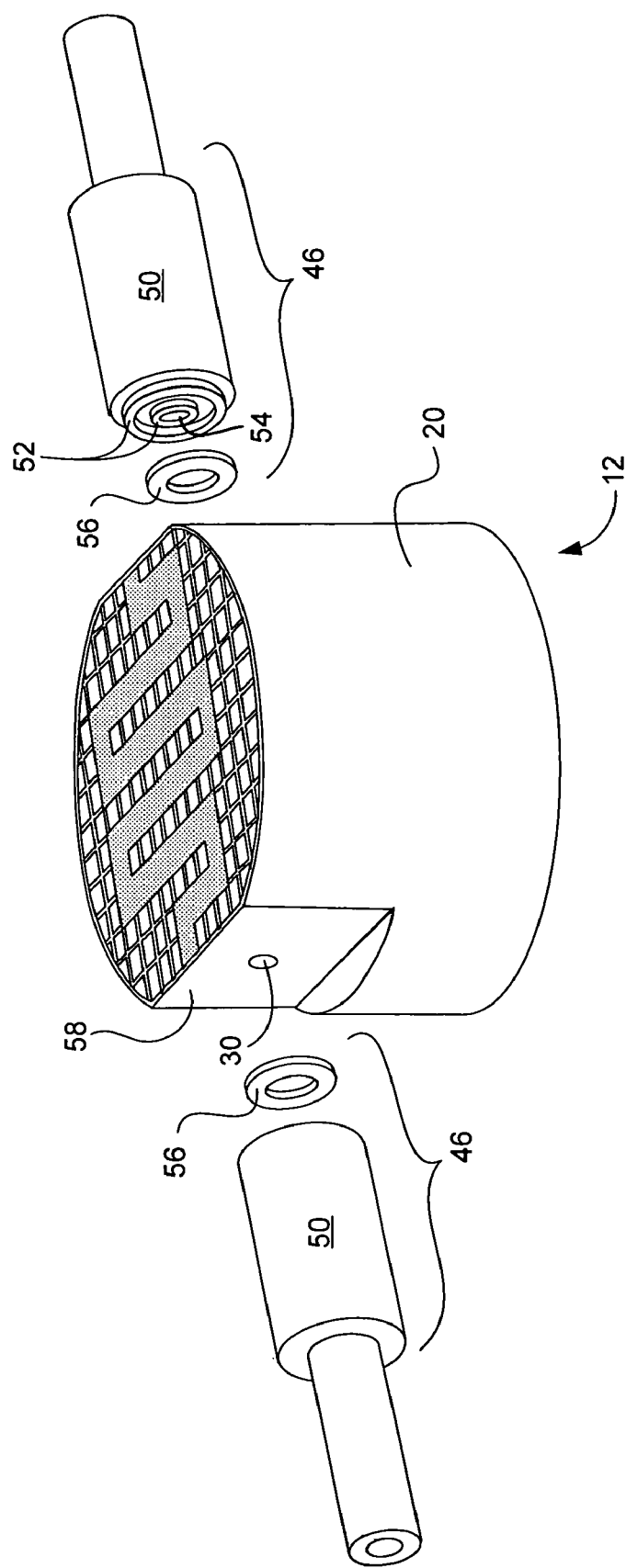
FIG. 8 is an exploded perspective view of a reactor component comprising an extruded multicellular body or honeycomb, showing fluidic couplers coupled to input and output ports at the side(s) of the extruded body.

FIG. 8 is an exploded perspective view of a reactor component 12 comprising an extruded multicellular body or honeycomb 20, showing fluidic couplers 46 arranged for coupling to input and output ports 30 at the side of the extruded body 20. Fluidic couplers 46 include a fluid coupler body 50 having raised concentric rings 52 surrounding a fluid passage 54. When assembled, an elastomeric O-ring 56 is retained by the raised rings 52 in compression against a flat surface 58 formed on the side of the body 20. The large number of wall structures within the extruded body 20 provides sufficient support for a robust compression seal against the flat surface 58. Alternative sealing methods are possible, including fired-frit seals, polymer adhesive seals, and any such as may be suitable for the intended application.

Figure 9:
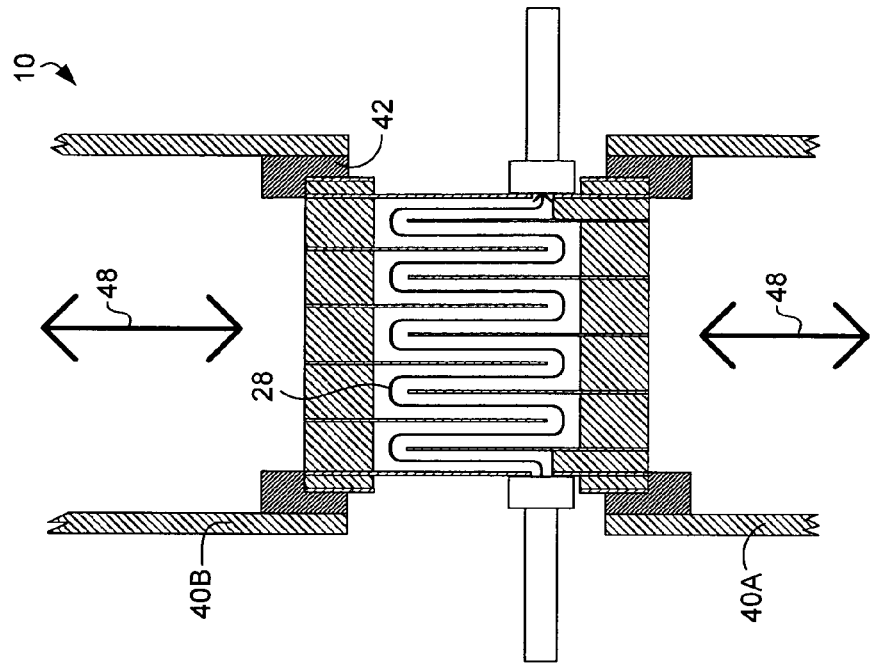
FIG. 9 is a cross-sectional view of a reactor component of the present invention comprising an extruded multicellular body or honeycomb showing fluidic connections to the extruded body according to another embodiment of the present invention.

A reactor component 12 such as the one in the embodiment of FIG. 8 allows for one presently preferred alternative configuration of a reactor 10, shown in FIG. 9, which is a cross-sectional view of the main components of another embodiment of a reactor 10 of the present invention. The reactor 10 of FIG. 9 comprises an extruded multicellular body or honeycomb 20 and includes side-port fluidic connections to the extruded body 20. Advantages over the embodiment of FIG. 8 in include the absence of seals 44, and absence of any seal (such as seals 44 or fluidic couplers 46) directly between the two fluid paths 28, 48. Seal materials may thus be optimized for the fluid of each path independently, and seal failures will not result in fluids from the two paths 28, 48 intermixing.

A reactor for reacting a gaseous reactant stream with a falling film liquid reactant stream requires some method or means of forming a thin falling film on the relevant surface(s) of the reactor. According to an embodiment of the devices and methods of the present invention, the liquid reactant is delivered, such as by one or more liquid distribution tubes 64, as shown in FIG. 10. The liquid reactant is flowed or dropped onto the surface of the plugs or continuous plugging material 26, or in other words, on the surface 27 above the closed cells of the body 20. As shown in the cross section of FIG. 11, the liquid reactant stream 62 then follows the follows the path shown by the arrows 62 representing the liquid reactant stream 62, flowing over the edges of the closed cells of the body 20, and down the inside surfaces of the open cells. Gaseous reactant stream 48 flows in the center of the open cells, in countercurrent flow in this case, while a heat exchange fluid, which may also be in form of a reactant stream providing a reaction that acts as a source or sink of heat, is flowed along passage 28. A liquid collector 66 collects the reactant liquid stream 62.

Figure 12:
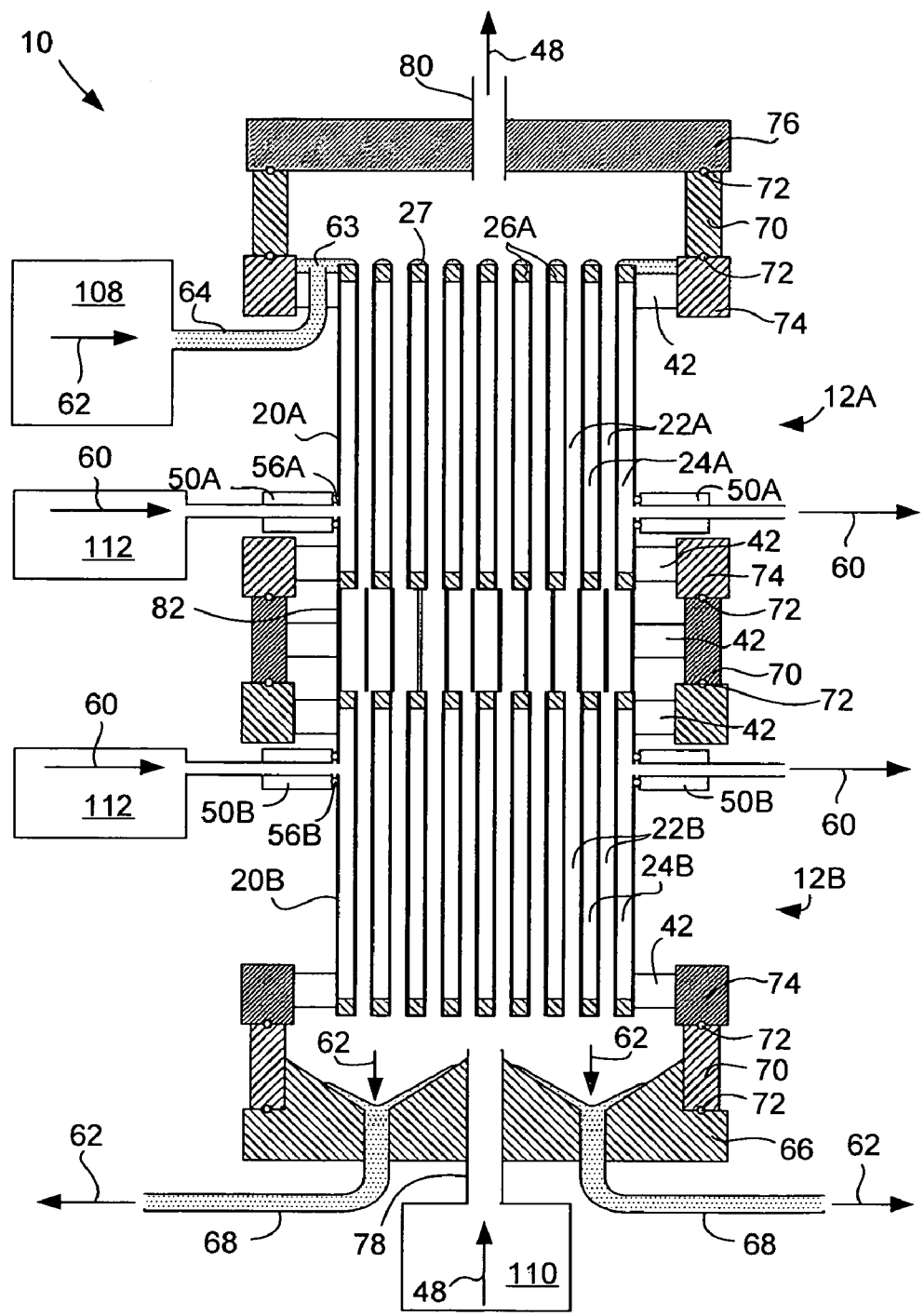
FIG. 12 is one embodiment of reactor 10 comprising two extruded bodies 20A and 20B.

A reactor 10 according to another embodiment of the present invention is shown in diagrammatic cross-section in FIG. 12. Two reactor components 12A and 12B, each comprising a respective extruded body 20A, 20B, are positioned one below the other with each body oriented with its cells extending in a vertically downward direction. Each body 20A, 20B has a first plurality of cells 22 open at both ends of the body and a second plurality of cells 24 closed at one or both ends of the body, as shown and discussed above with respect to FIGS. 1-6. As one alternative, open cells 22 may include in or on their interior surfaces, one or more catalytic materials, depending on the desired reactions to be performed. Note that some details shown in FIGS. 1-6 are not shown or are not labeled in FIG. 12, for ease of representation.

As in FIGS. 1-6, the second plurality of cells 24 is arranged in one or more groups of contiguous cells and cooperates to define at least in part at least one fluidic passage 28 extending through the bodies 20A, 20B.

The reactor 10 of FIG. 12 further comprises a fluid source 108 arranged so as to be able to distribute reactive fluid stream 62 to the first plurality of cells 22 at the first end of the extruded body 20A, through liquid distribution tube 64. The delivered fluid steam 62 forms and annular ring of fluid 63 contained by the housing components of the reactor 10 described below. The annular fluid ring overflows onto the surface 27 of the continuous plugging material 26A of the topmost body 20A. From surface 27, the fluid stream 62 overflows and forms a falling film down the interior of the open cells 22 of body 20A.

Body 20A is connected to body 20B via a spacer 82 in the form of a short section of open-cell extruded body, in this embodiment having a cell size greater than that of bodies 20A and 20B. The liquid reactant stream accordingly flows downward from the open cells of body 20A through the spacer along its internal surfaces and into the open cells of body 20B.

The reactor 10 is provided with a gas source, connected via gas inlet tube 78, so as to be able to flow a gas reactant stream 48 through the first plurality of cells 22 of both bodies 20A and 20B. Two heat exchange fluid sources 112 are connected to the respective fluidic passages 28 in bodies 20A and 20B so as to be able to flow a heat exchange fluid 60 therethrough. If desired, different fluids or at least different temperatures may be employed in the two bodies 20A and 20B.

As shown in FIG. 12, this embodiment uses side ports for access to the heat exchange fluid paths, via fluid coupler bodies 50A and 50B. End ports as in FIG. 7 are an alternative.

Elements of the housing supporting bodies 20A and 20B include an end plate 76 at the top end of the reactor 10 through which a gas outlet tube 80 extends, allowing reactant gas stream 48 to exit the reactor, and an endplate in the form of a liquid collector 66, though which gas inlet tube 78 extends, and through which liquid exit tubes 68 also extend. The various sections of the housing are formed by tube sections 70, sealed to endplates 76 and 66 via O-rings 72. Near the ends of bodies 20A and 20B, tube sections 70 are sealed via O-rings 72 to mounting rings 74, which support the extruded bodies 20A and 20B, as well as spacer 82, via seals 42. Seals 42 may be elastomeric seals, epoxy-based or any appropriate material. In the embodiment of FIG. 12, the top-most of seals 42 also contains the annular reservoir or ring of fluid 63, and provides sealing for reaction fluid inlet tube 64.

Figure 13:
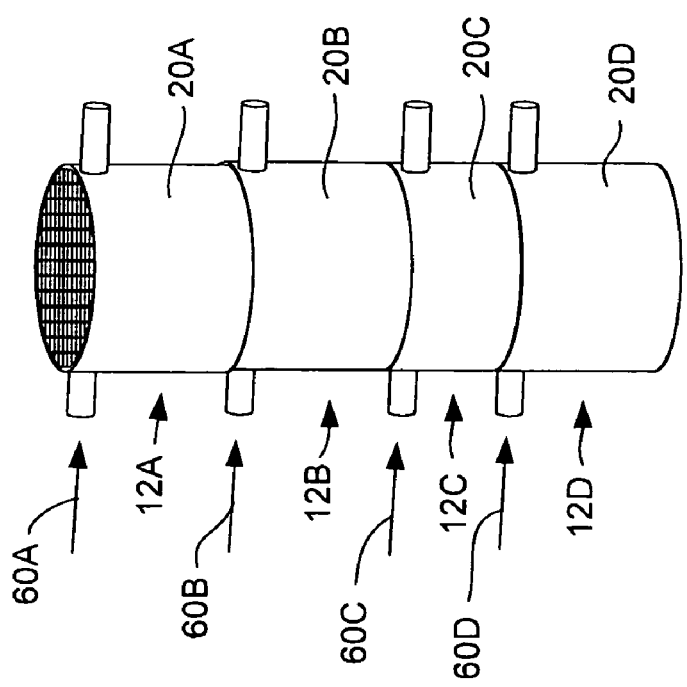
FIG. 13 is a perspective view showing multiple bodies 20A-20D arranged as part of a single reactor.

As shown in the perspective view of FIG. 13, a reactor according to the present invention may include more than two multicellular extruded bodies such as bodies 20A-D shown in the figure, each positioned below the first body 20A, and each having, as disclosed in FIGS. 1-6, a respective plurality of open cells and a respective plurality of closed cells defining respectively at least one fluidic passage. The successive bodies 20B-20D after the first body 20A are positioned and arranged to receive one or both of the fluid reactant and the gaseous reactant flow from the respective next higher body. The heat exchange fluid flows 60A-60D may be identical or may be individualized for each respective body 20A-20D. The respective vertical lengths of each body 20A-20D may also be chosen for the needs of the reaction to be performed: they need not be of uniform length, as illustrated by the shorter body 20C.

Figure 14:
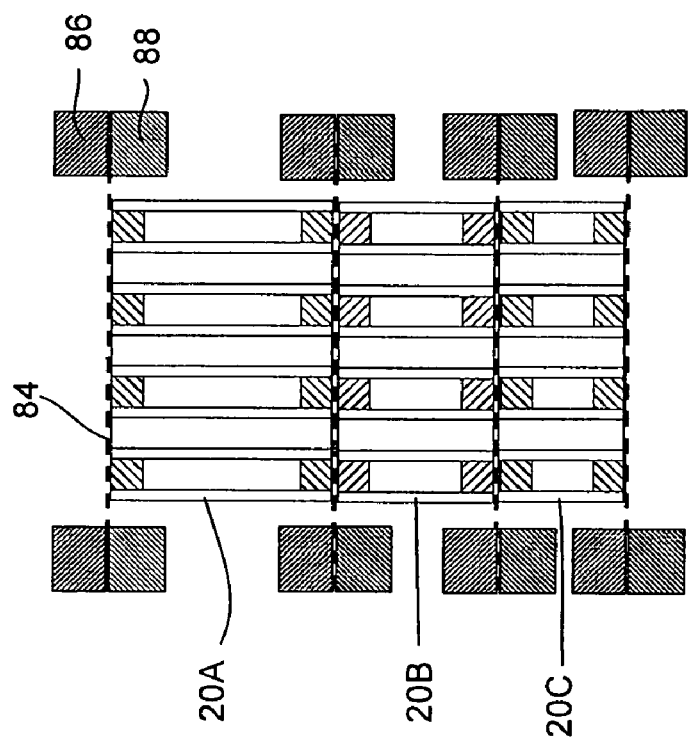
FIG. 14 is cross-sectional view showing positioning of flame barrier screens 84.

It is desirable in the context of some falling filth reactions to prevent potential flame or explosion propagation within the reactor 10, as flammable or explosive reactants may be used, or flammable or explosive products may be produced. Accordingly, as a further alternative within the context of the present invention, a flame barrier screen 84 may be provided, positioned at the ends of each body 20A-20C, as shown in FIG. 14. the screens 84 may be mounted in various ways, such as by tension rings 86, 88 that cooperate to keep the screens 84 tight. For purposes of reactor design and reaction engineering, along with the use of screens 84, the length of the bodies 20A-20C (that is, the length of the cells) and the width of the cells can be chosen to avoid any risk of out-of-control or explosive reactions. Again, lengths of extruded bodies may be different as needed for this optimization.

Figure 19:
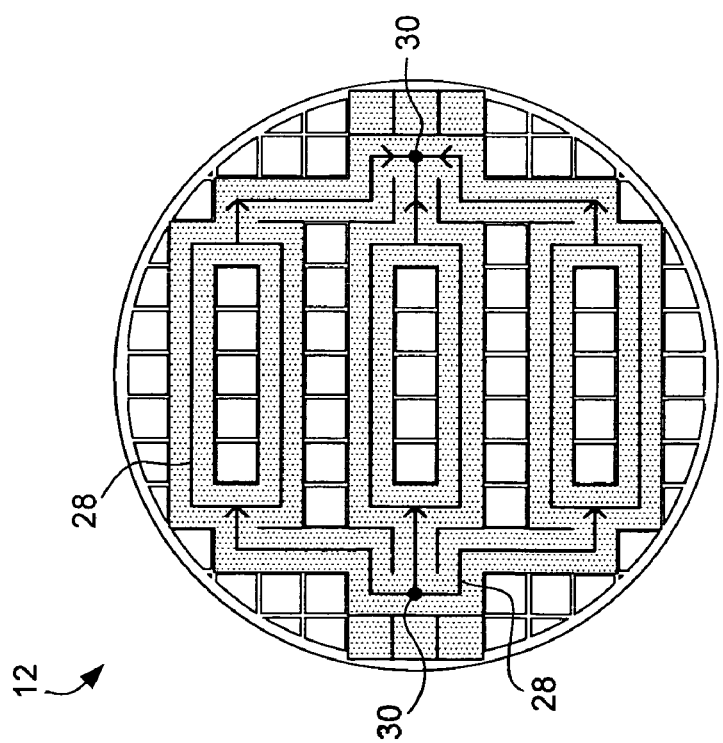
FIG. 19 is a plan view of reactor comprising an extruded multicellular body or honeycomb showing yet another fluidic path in a plane perpendicular to the cells according to an embodiment of the present invention.

Alternatives for mounting or securing screens 84 include end face clamps 90, such as shown at the top of FIG. 19, where the screen is clamped over a part of the surface 27 at the top of the closed cells. End face clamping may also be achieved by use of a section of extruded body 92 with open cells, as shown at the bottom of the figure. Tension rings may be used in combination with end-face clamping, or may be omitted.

Figure 16:
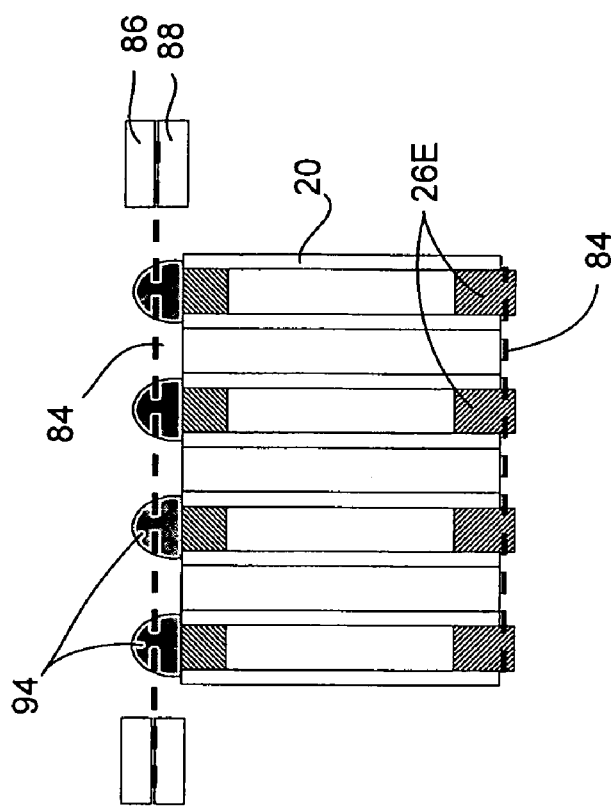
FIGS. 15 and 16 show alternative mountings for flame barrier screens.
Figure 15:
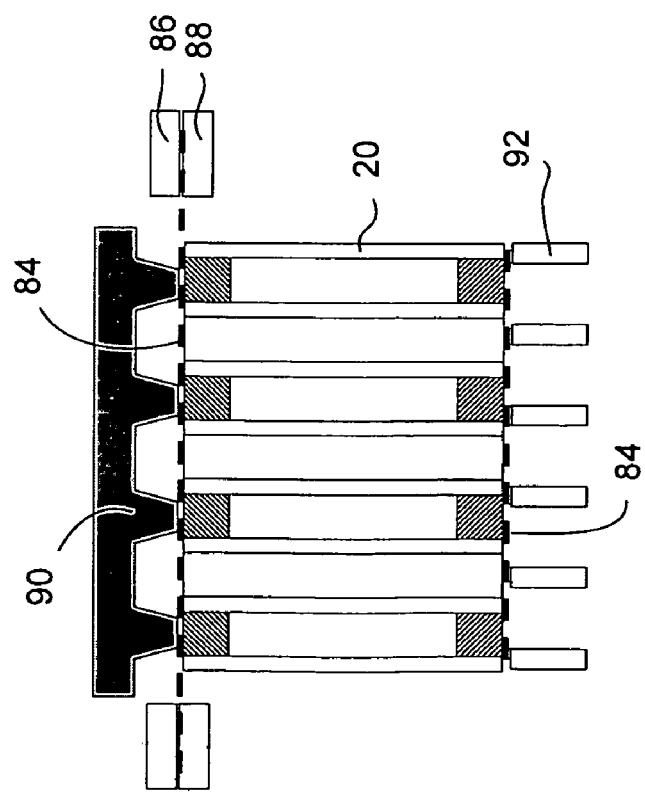

Two other alternatives for screen mounting are shown in FIG. 16, in which the top screen 84 is mounted in an adhesive 94 positioned on top of the closed cells. The bottom screen 84 is mounted by being incorporated into extended plugs 26E. Tension rings are optional in either case, but likely superfluous in the case of extended plugs 26E.

Figure 17:
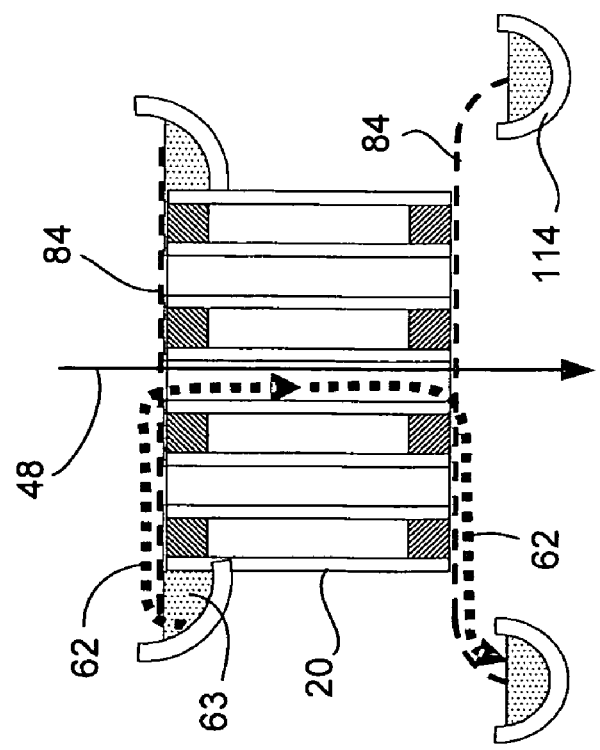
FIG. 17 is a cross-section showing the use of flame barrier screens to aid in reactant fluid distribution.

Flame barrier screens may also be used to aid in the distribution of reactant fluid 62, as illustrated in the cross section of FIG. 17. The top screen 84 helps wick or otherwise conduct reactant fluid 62 from the annular ring of fluid 63 to the tops of the closed cells in the body 20, and the bottom screen, which may be curved as shown in the figure, helps wick or otherwise conduct the reactant fluid 62 from the bottoms of the open cells in body 20 to an annular receiving trough 114. In this embodiment, the gaseous reactant flow 48 is desirably in the co-current direction, as shown, to assist the reactant fluid motion along and off from the screens 84, although counter-current is possible.

Figure 18:
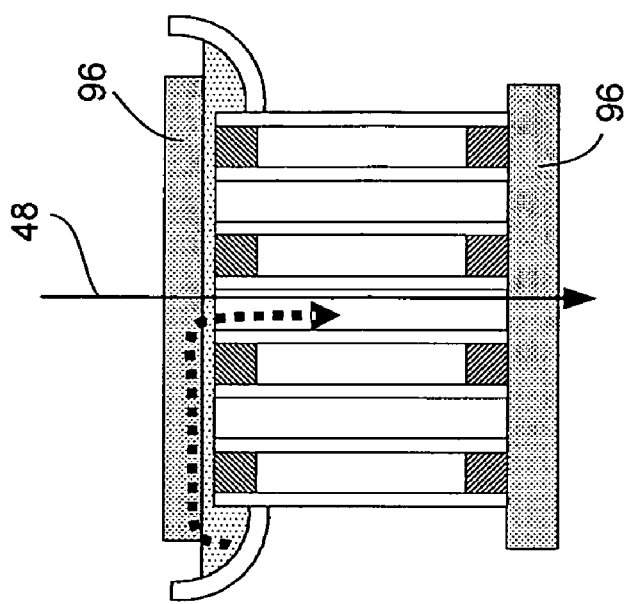
FIG. 18 is a cross section showing use of a porous body flame barrier 96 as an alternative to a flame barrier screen.

As an alternative to flame barrier screens, porous body flame barriers 96 may be used, as shown in the cross-section of FIG. 18. The porous body may also assist reactant fluid distribution as shown.

As shown in the description above, it will be understood that the present invention also provides a method of performing a reaction involving a gaseous reactant stream and a falling film liquid reactant stream. The method includes providing a reactor that comprises at least a first multicellular extruded body oriented with its cells extending in parallel in a vertically downward direction from a first end of the body to a second end. The body also has a first plurality of cells open at both ends of the body and a second plurality of said cells closed at one or both ends of the body, with the second plurality of cells arranged in one or more groups of contiguous cells cooperating to define at least in part one or more fluidic passage extending through the body. The one or more passages may have a serpentine path back and forth along cells of the second plurality, and the passage may connect laterally from cell to cell, within cells of the second plurality, at or near the ends of the body. The method further includes flowing a liquid reactant film down inner surfaces of the first plurality of cells while flowing a gaseous reactant stream up or down the centers of the first plurality of cells, while flowing at least a first heat exchange fluid through the at least one fluidic passage. The method may include providing a reactor having catalytic material in or on the inner surfaces of the first plurality of cells. The method may also include using multiple successive extruded bodies, optionally with different heat exchange feeds, and further optionally with varying reactant feeds for each.

Figure 20:
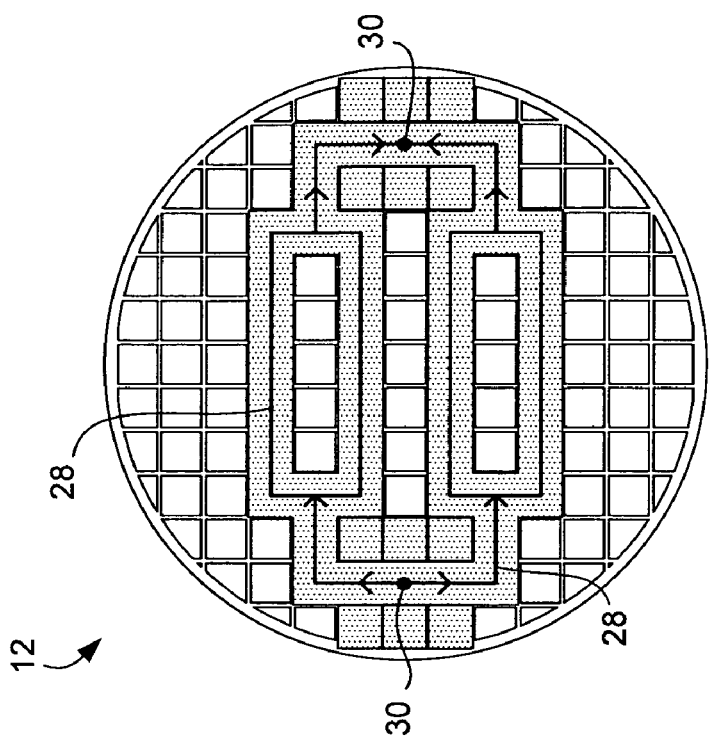
FIG. 20 is a plan view of reactor comprising an extruded multicellular body or honeycomb showing still another fluidic path in a plane perpendicular to the cells according to an embodiment of the present invention.
Figure 21:
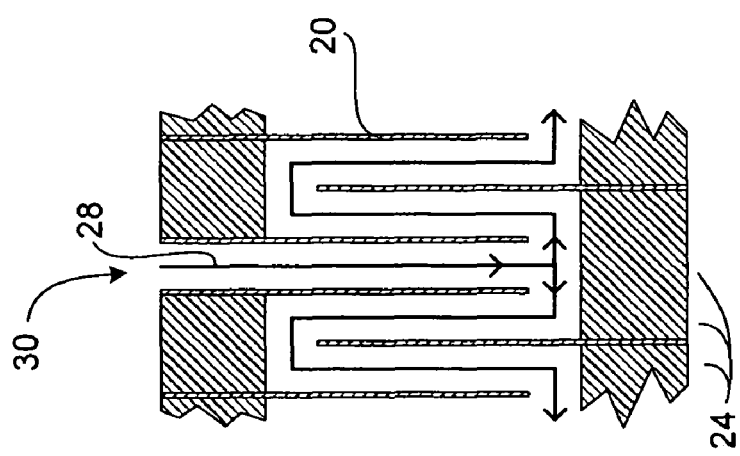
FIG. 21 is cross-sectional view of channels closed on one or both ends of an extruded body, showing a method useful in the context of the present invention for manifolding or dividing fluid pathways, with two pathways beginning from one and beginning within the extruded body.

In case pressure drop associated with flowing heat exchange fluid 60 along the path 28 through extruded bodies 20 of the present invention is too large for a particular reactor or reaction design, the flow path can be split into multiple parallel paths via an integrated manifold structure. FIGS. 19 and 20 are plan views of reactor components 12 comprising an extruded multicellular body or honeycomb showing still another fluidic path 28 in a plane perpendicular to the cells 22, 24 according to additional alternative embodiments of the present invention. As may be seen in the figures, these embodiments include manifolding or dividing of the fluid path within the fluidic passage 28, such that the path 28 divides into parallel paths in the plane perpendicular to the cells. FIG. 21 is cross-sectional view of channels 24 closed on one or both ends of an extruded body 20, showing a method useful in the context of the present invention for manifolding or dividing fluid pathways, with two pathways dividing from one in a plane parallel to the cells 24, and beginning within the extruded body 20.

Figure 22:
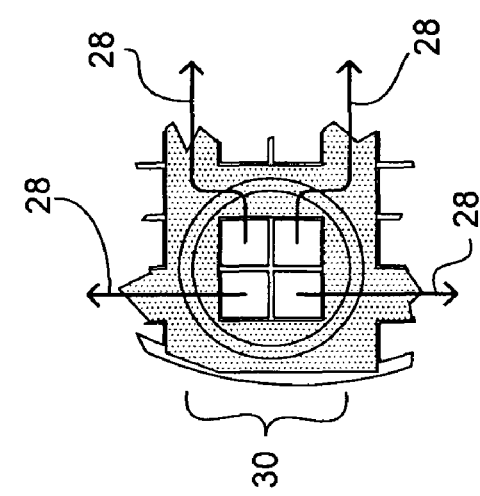
FIG. 22 is a partial plan view of one end of an extruded body or honeycomb structure showing multiple passages beginning within the extruded body at an input port on the one end of the extruded body.

FIG. 22 is a partial plan view of one end of an extruded body or honeycomb structure showing a method of or structure for manifolding having multiple parallel passages 28 beginning within the extruded body at an input port 30 on the one end of the extruded body.

Figure 23:
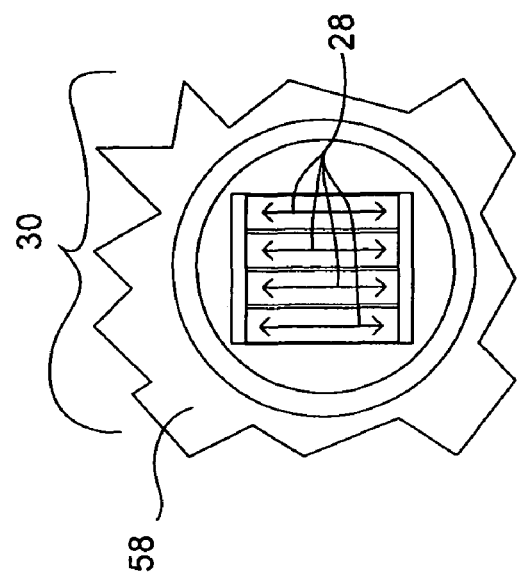
FIG. 23 is a partial side view of an extruded body or honeycomb structure showing multiple passages beginning within the extruded body at an input port on a wall on a side of the extruded body.

FIG. 23 is a partial side view of an extruded body or honeycomb structure showing another embodiment of multiple passages 28 beginning within the extruded body at an input port 30 on a wall or flat surface 58 on a side of the extruded body.

Figure 24:
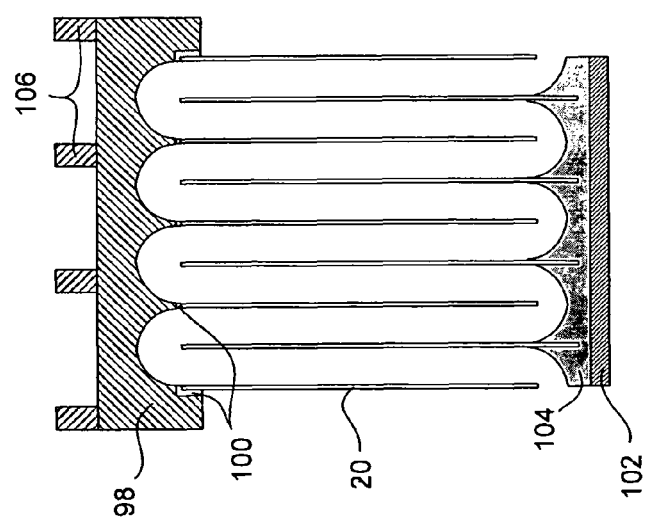
FIG. 24 is a cross section of a portion of an extruded body 20 showing alternative ways of forming the heat exchange flow path 28 within the extruded bodies 20 of the present invention.

FIG. 24 shows alternative ways of forming the heat exchange flow path 28 within the extruded bodies of the present invention. As one alternative, shown at the top of the body 20 of FIG. 24, a contoured endcap may be employed, together with a gasket or other sealing material 104. In this particular alternative, the walls of the cells of the body 20 require no modification. As a second alternative, shown at the bottom of the body 20 of FIG. 24, a end plate 102 is provided with a contoured sealing material 104, and the walls of the body are shortened to allow the sealing material 104 to grip the sides of the non-shortened walls, while allowing lateral passage from cell to cell.

Figure 25:
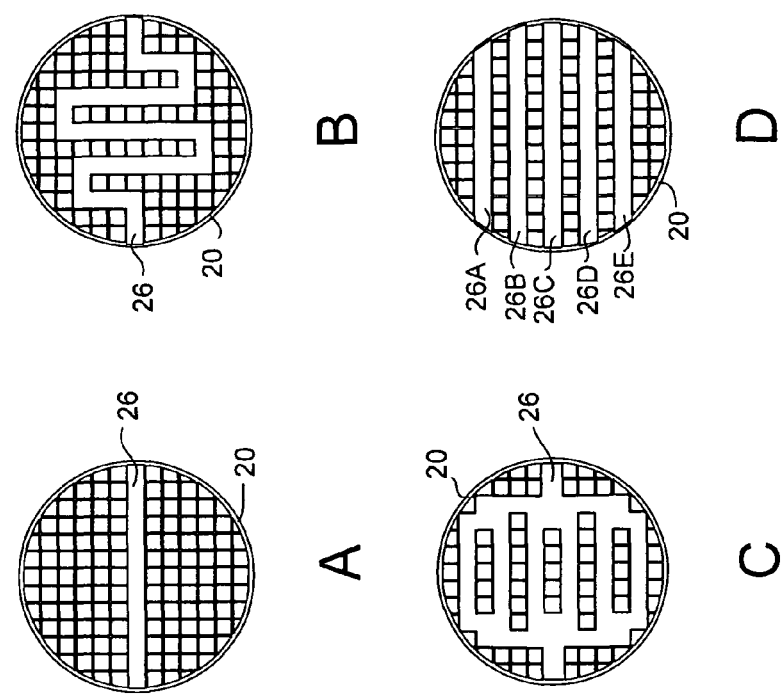
FIGS. 25A-25D are alternative plan views of an end of an extruded body 20 showing alternative patterns for the plugs or continuous plug material 26, corresponding to the pattern of the closed cells beneath.

FIGS. 25A-25D shows alternative patterns for the plugs or continuous plug material 26, corresponding to the pattern of the closed cells beneath. In each case, the fluid path defined within the closed cells may be serpentine along the direction of the cells. In FIG. 25B, the resulting path may be doubly serpentine, in 25C the path in the plane perpendicular to the cells is parallel with manifolding within the body 20, and in 25D the path is parallel with manifolding, if any, external to the body 20.

What is claimed is:

1. A method of performing a reaction involving a gaseous reactant stream and a falling film liquid reactant stream, the method comprising the steps of:

providing a reactor comprising a first multicellular extruded body oriented with its cells extending in parallel in a vertically downward direction from a first end of the body to a second end, the body having a first plurality of cells open at both ends of the body and a second plurality of said cells closed at one or both ends of the body, the second plurality of cells being arranged in one or more groups of contiguous cells and cooperating to define at least in part at least one fluidic passage extending through the body;

flowing a liquid reactant film down inner surfaces of the first plurality of cells while flowing a gaseous reactant stream up or down the centers of the first plurality of cells while flowing a first heat exchange fluid through the at least one fluidic passage.

2. The method as claimed in claim 1 wherein providing a reactor further comprises providing a reactor having catalytic material in or on the inner surfaces of the first plurality of cells.

3. The method as claimed in either of claims 1 and 2 wherein providing a reactor further comprises providing a reactor having at least a second multicellular extruded body positioned below the first, the second body having a second body plurality of open cells and a second body plurality of closed cells defining at least one second body fluidic passage, and wherein (1) flowing a liquid reactant film further comprises flowing a liquid reactant film down inner surfaces of the second body plurality of open cells, (2) flowing a gaseous reactant stream further comprising flowing a gaseous reactant stream up or down the centers of the second body plurality of cells open cells, and (3) flowing a heat exchange fluid further comprises flowing a second heat exchange fluid through the at least one second body fluidic passage.

4. A reactor for reacting a gaseous reactant stream with a falling film liquid reactant stream, the reactor comprising:
 a first multicellular extruded body oriented with its cells extending in parallel in a vertically downward direction from a first end of the body to a second end, the body having a first plurality of cells open at both ends of the body and a second plurality of said cells closed at one or both ends of the body, the second plurality of cells being arranged in one or more groups of contiguous cells and cooperating to define at least in part at least one fluidic passage extending through the body;
 a fluid source structured and arranged so as to be able to distribute fluid to the first plurality of cells at the first end of the extruded body;
 a gas source positioned either above or below the extruded body structured and arranged so as to be able to flow a gas through the first plurality of cells; and
 a heat exchange fluid source connected to said at least one fluidic passage structured and arranged so as to be able to flow a heat exchange fluid therethrough.

5. The reactor as claimed in claim 4 wherein the at least one passage has a width of one cell in a plane perpendicular to the cells of the body.

6. The reactor as claimed in either of claims 4 and 5, wherein the passage has a serpentine path leading back and forth at least two times along the cells of the second plurality of cells.

7. The reactor as claimed in claim 4, wherein the passage is accessible from the exterior of the body via an input port and an output port, the input port positioned at the first end of the body and surrounded by cells of the body which are closed by plugs at the first end of the body.

8. The reactor according to claim 4, wherein the passage is accessible from the exterior of the body via an input port and output port, the input port positioned at in a wall at a side of the body.

9. The reactor according to claim 4, further comprising a first and second flame barriers positioned at the first and second ends of the body.

10. The reactor according to claim 4, further comprising one or more second multicellular extruded bodies, each positioned below the first body, each having a respective plurality of open cells and a respective plurality of closed cells defining respectively at least one fluidic passage, the successive bodies being positioned and arranged to receive one or both of fluid reactant and gaseous reactant flow from the respective next higher body.

* * * * *